Dec. 26, 1950    M. B. RASMUSSON    2,535,231
METHOD AND APPARATUS FOR MAKING
FROZEN CONFECTIONS

Filed May 13, 1944    6 Sheets-Sheet 1

INVENTOR.
MARLIN B. RASMUSSON
BY George B. White
ATTORNEY

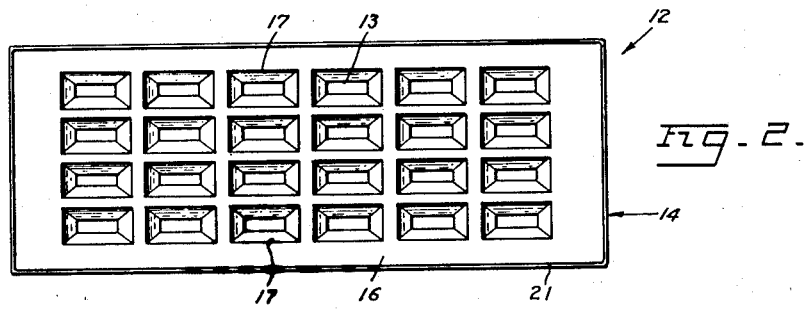
Fig. 2.
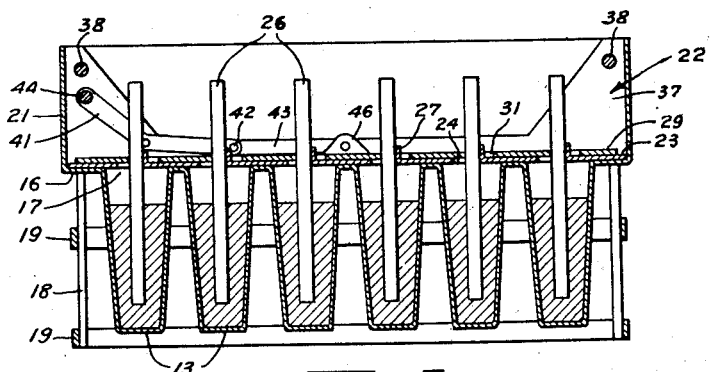
Fig. 3.
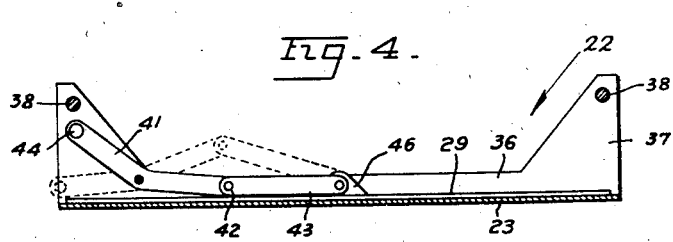
Fig. 4.
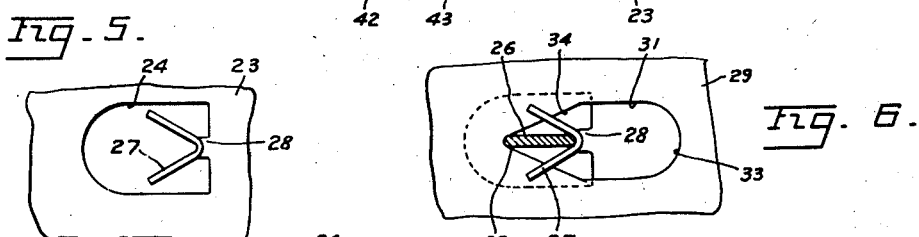
Fig. 5.
Fig. 6.
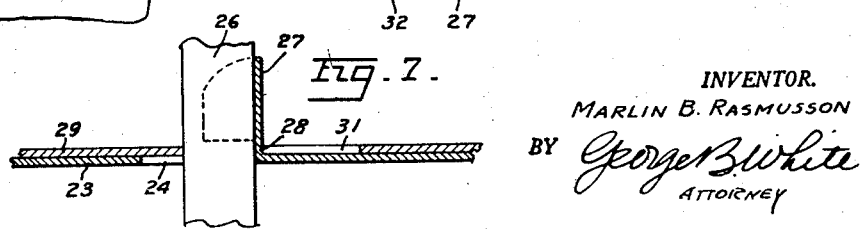
Fig. 7.
INVENTOR.
MARLIN B. RASMUSSON
BY George B. White
ATTORNEY Dec. 26, 1950

M. B. RASMUSSON
METHOD AND APPARATUS FOR MAKING
FROZEN CONFECTIONS 2,535,231

Filed May 13, 1944

INVENTOR.
MARLIN B. RASMUSSON
BY George B. White
ATTORNEY

Dec. 26, 1950
M. B. RASMUSSON
METHOD AND APPARATUS FOR MAKING
FROZEN CONFECTIONS
2,535,231
Filed May 13, 1944
6 Sheets-Sheet 4
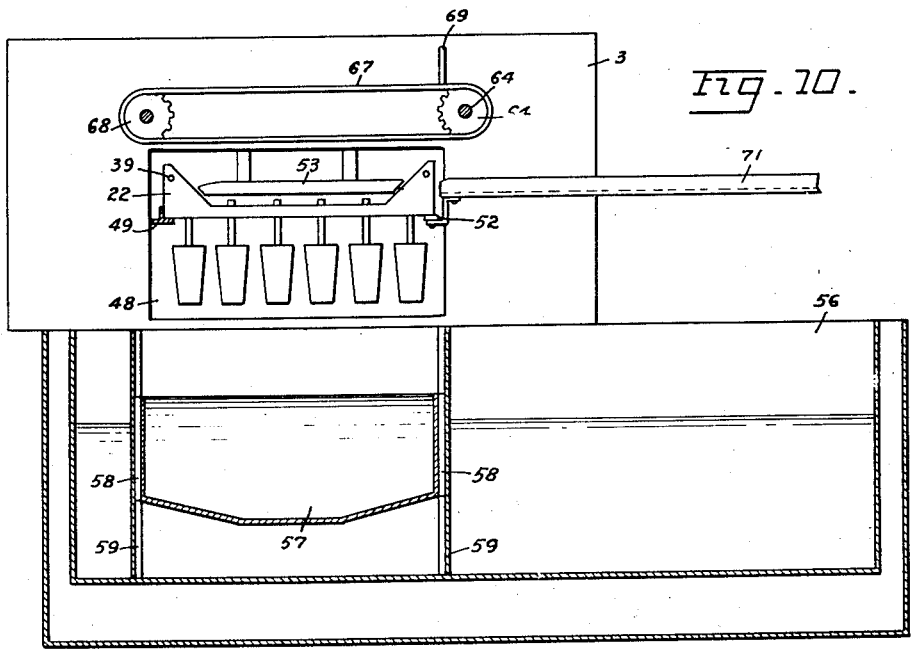
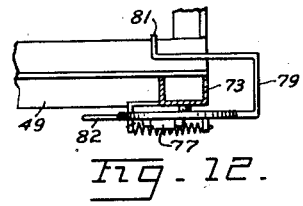
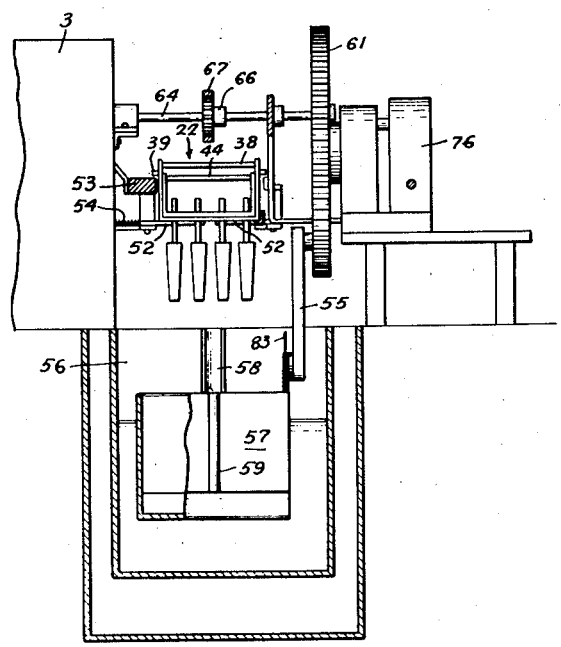
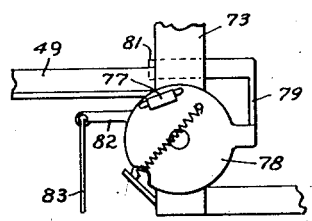
INVENTOR.
MARLIN B. RASMUSSON
BY George B. White
ATTORNEY

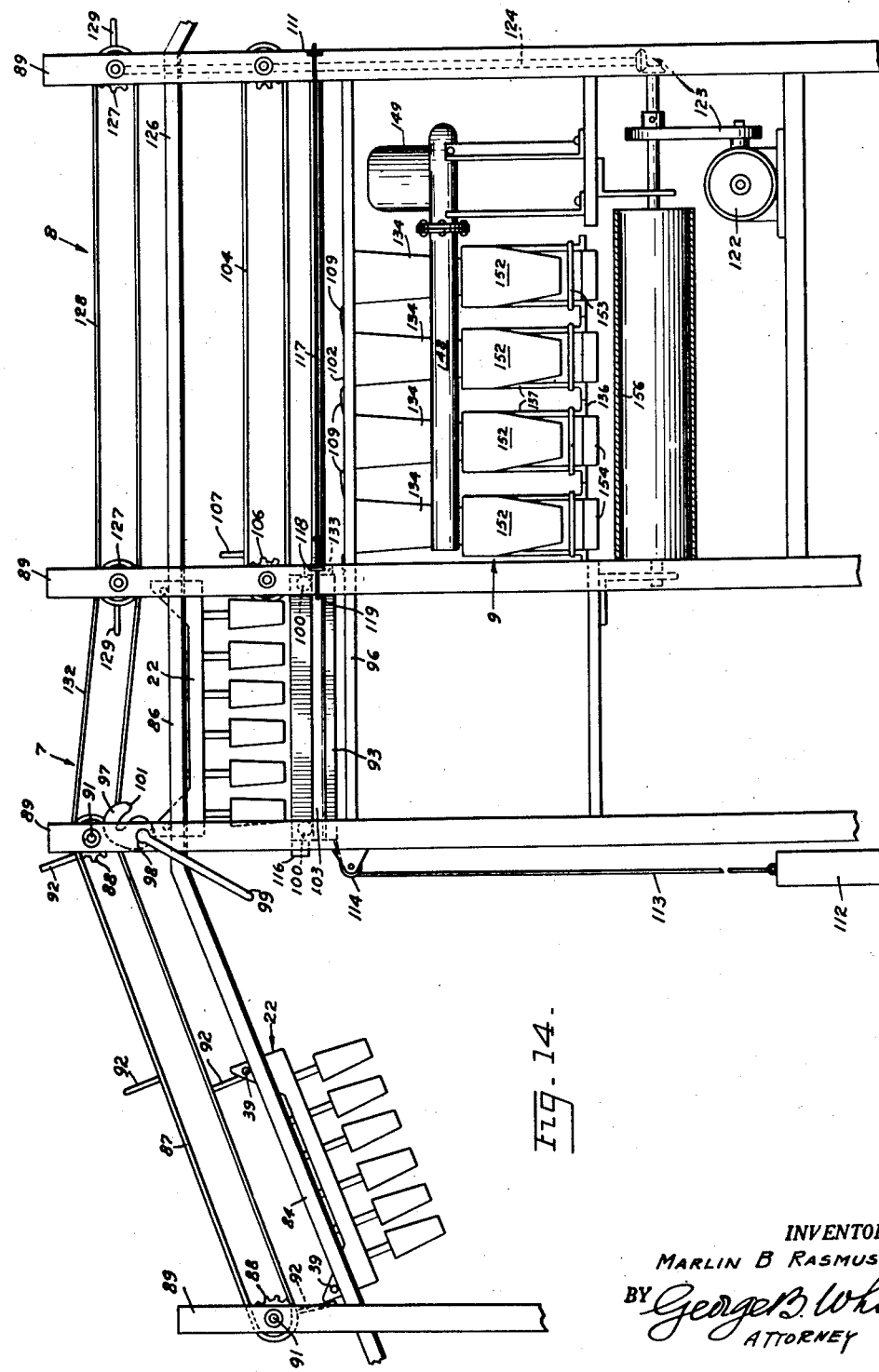

Dec. 26, 1950  M. B. RASMUSSON  2,535,231
METHOD AND APPARATUS FOR MAKING
FROZEN CONFECTIONS
Filed May 13, 1944  6 Sheets-Sheet 6
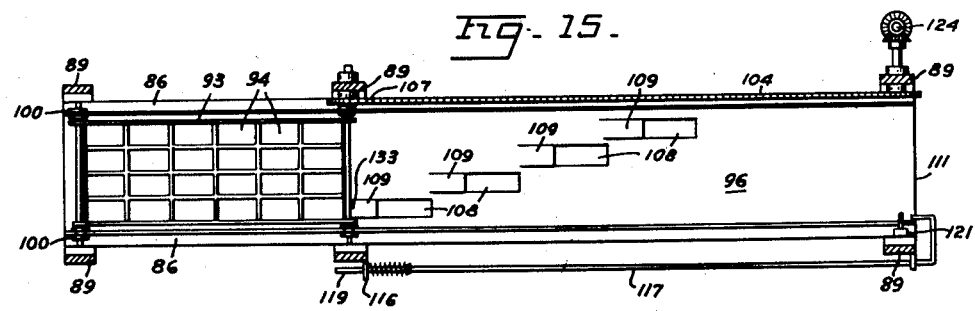
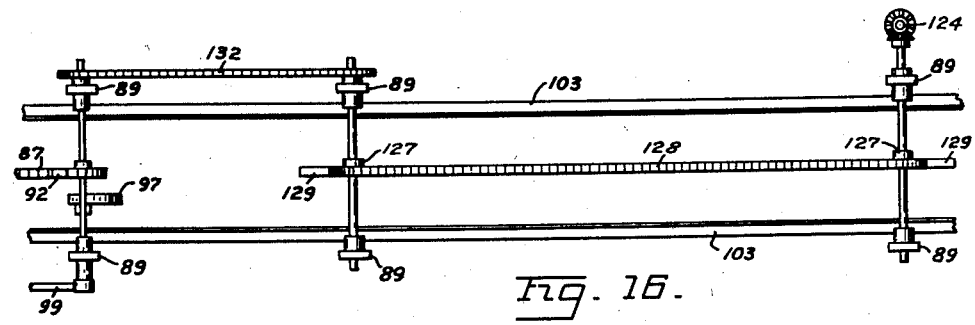
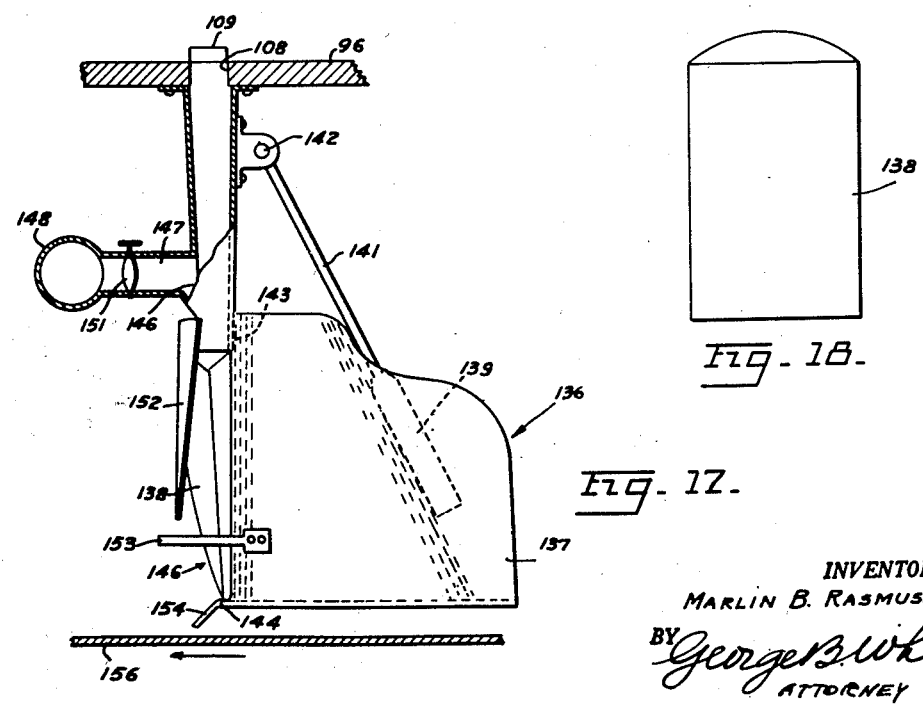
INVENTOR.
MARLIN B. RASMUSSON
BY George B. White
ATTORNEY Patented Dec. 26, 1950

2,535,231

UNITED STATES PATENT OFFICE 2,535,231

METHOD AND APPARATUS FOR MAKING FROZEN CONFECTIONS

Marlin B. Rasmusson, Sacramento, Calif., assignor to Vitafreze Equipment, Inc., Sacramento, Calif., a corporation of California Application May 13, 1944, Serial No. 535,502

21 Claims. (Cl. 107—54)

This invention relates to a method and apparatus for making frozen confections, and particularly for making and packaging ice cream bars.

The primary object of the invention is to provide a method and apparatus whereby confection, such as ice cream, can be frozen and molded into forms of bars or the like, properly treated and handled as well as bagged automatically but at an intermittent rate suitable to the operator, and without touching the confection or ice cream bars by hand.

Another object of the invention is to provide a method and apparatus through which frozen confection, such as ice cream is intermittently advanced and subjected to a series of treatments such as the re-hardening of its surface, coating, the hardening of the coating, or the prevention of the melting of the surface of the ice cream bars in the course of treatment, and finally, automatically fed into bags and delivered, properly bagged and properly hardened.

Another object of the invention is to provide an apparatus where the confection such as ice cream is treated to prevent the softening of its surface during its advance through the apparatus and in which the confection is coated and its coating hardened, or if no coating is required, then its surface is re-hardened in the course of operation, and wherein a considerable number of confections or ice cream bars are simultaneously carried over and fed into suitable bagging mechanism, so that the ice cream bars are made, treated and bagged at a suitable rate and without being touched by human hands.

Another object of the invention is to provide an apparatus to treat frozen confection, such as ice cream bars carried in considerable numbers on suitable holder arranged in a predetermined pattern, and to harden the surface of the frozen confection or ice cream bars while they are passing through the various parts of the apparatus, and to apply a coating to the surface of the ice cream bars while they are passing through another phase or part of the apparatus, and to transfer the treated ice cream bars to a discharge carrier in the same predetermined pattern of arrangement as in the holder, said carrier feeding said bars properly and accurately into a suitable bagging mechanism of a particular type, for rapid bagging and discharging the packaged or bagged ice cream bars from said apparatus.

Other objects of the invention together with the foregoing will be set forth in the following description of the preferred method, and the preferred embodiment of means for practicing the same, which is illustrated in the drawings accompanying and forming part of the specification. It is to be understood that I do not limit myself to the embodiment disclosed in said description and the drawings as I may adopt variations of my preferred forms within the scope of my invention.

The invention is clearly illustrated by the accompanying drawings wherein:

Fig. 2 is a plan view of mold in which the confection is frozen.

Fig. 3 is a sectional view of said mold with a stick holder thereon holding sticks in the confection in the mold compartments.

Fig. 4 is a sectional side view of the stick holder.

Fig. 5 is a fragmental plan view of the clamp hole and the holder prong on the bottom of the stick holder.

Fig. 6 is a fragmental plan view of the stick clamping elements of the stick holder.

Fig. 7 is a fragmental sectional view of the stick holder showing the clamping of a stick.

Fig. 10 is a sectional view taken on the lines 10—10 of Fig. 8.

Fig. 11 is a sectional view taken on the lines 11—11 of Fig. 9.

Fig. 12 is a fragmental detail plan view showing the abutment circuit breaker for intermittent operation.

Fig. 13 is a side view of said circuit breaker on the apparatus.

Fig. 14 is a side view of the conveying, releasing and bagging mechanisms of the apparatus.

Fig. 15 is a plan view of the discharge mechanism for the confection and the carrier for said mechanism.

Fig. 16 is a plan view of the synchronized drive mechanism for the conveying, releasing and discharge mechanisms.

Fig. 17 is a partly sectional view of one of the bagging devices, and

Fig. 18 is a side view of the bag in which the frozen confection is bagged.

Figure 1:
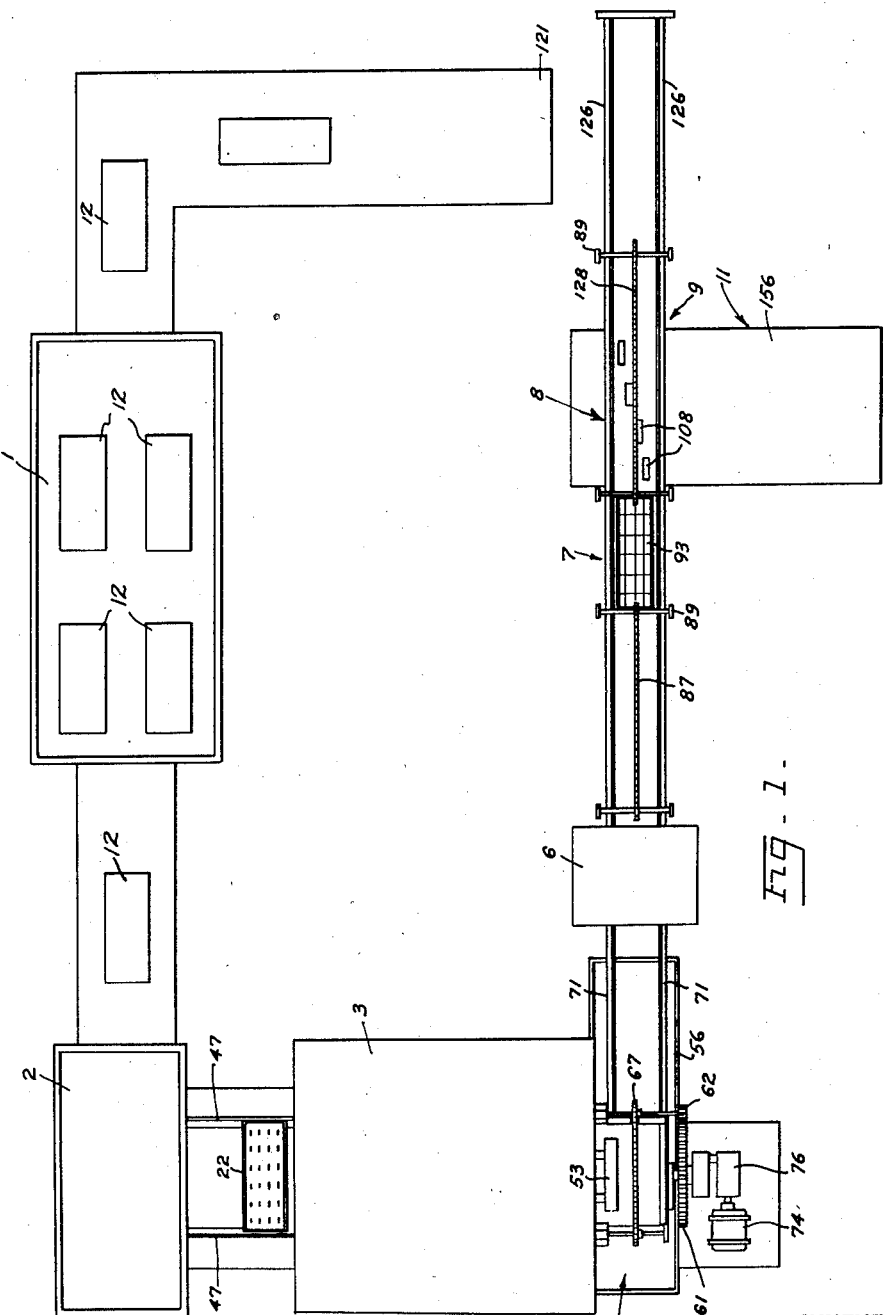
Fig. 1 is a diagrammatic plan view of the entire apparatus for making frozen confections.
Figure 8:
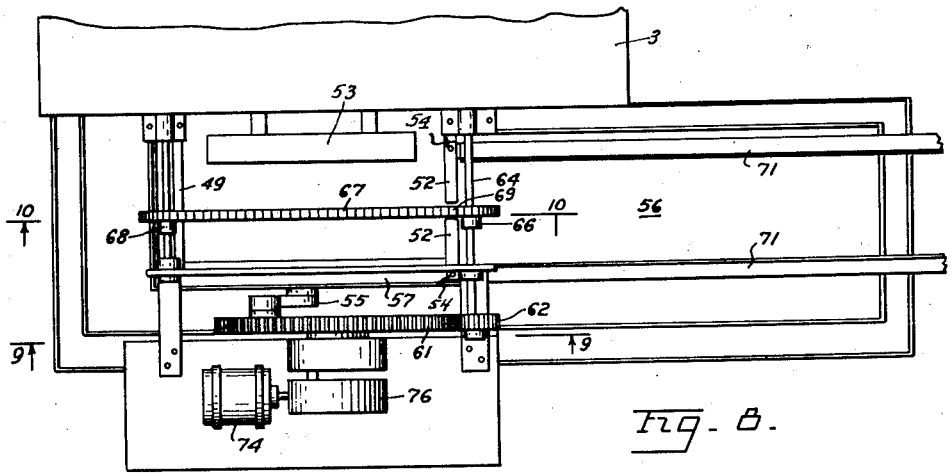
Fig. 8 is a plan view of the portion of the apparatus at the dipping and advancing mechanism.
Figure 9:
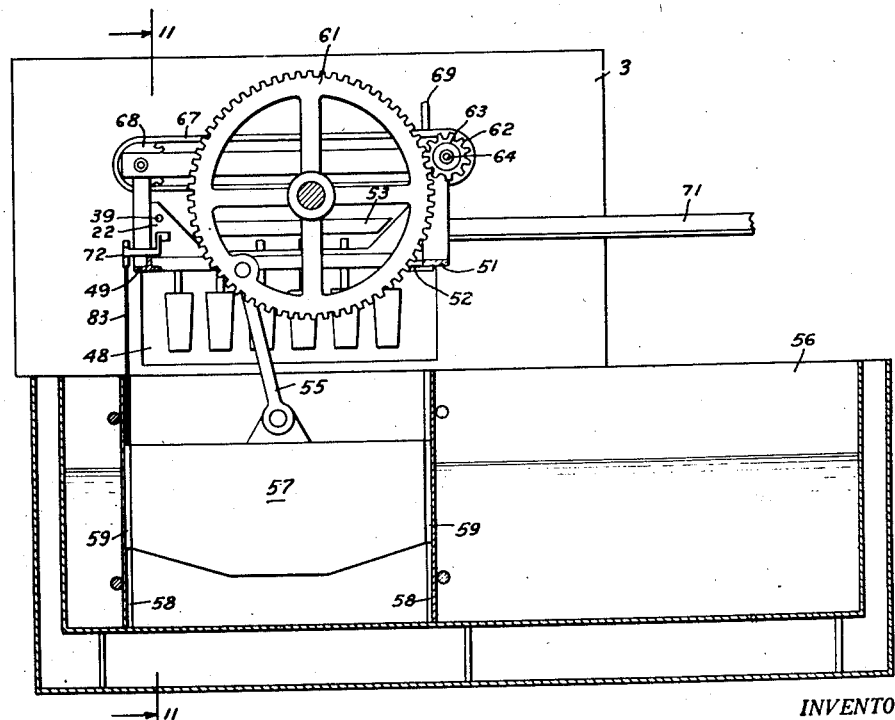
Fig. 9 is a sectional view taken on the lines 9—9 of Fig. 8.

In the herein illustrative embodiment of my invention I show it particularly adapted for making ice cream bars, but it is to be understood that my invention is for the making of frozen confections of any type adapted for molding and similar handling.

In the herein method ice cream bar are manufactured out of ice cream by pouring the soft ice cream into molds having a plurality, in the present illustration 24, compartments in four rows of six compartments in each row, formed in the shape of the usual ice cream bars. In the top of this mold is placed a holder with a gripping mechanism which holds the same number of sticks as there are compartments in the mold, in properly spaced relation and in the same pattern of arrangement as the arrangement of said compartments, so that the sticks held in the holder extend into the respective compartments of the mold. The assembled sticks and ice cream in the mold are then carried through a brine tank for a period of time required for the proper hardening of the ice cream in the molds into ice cream bars.

After the ice cream bars are hardened the assembled mold units are dipped momentarily into a heating chamber, preferably into hot water or liquid, so as to loosen the surfaces of the hardened ice cream bars from the sides of the compartments of the mold. The holder is then removed from the mold so that the sticks gripped by the holder lift the ice cream bars out of the mold. Then the holder with the plurality, in this case 24, ice cream bars suspended by the sticks, is then placed on a conveyor or guide and is advanced intermittently at a rate suitable to the operator through the apparatus for the various steps of the treatment to its completion. The first step is of carrying the ice cream bars on said holder through a refrigerator chamber for a sufficient period to re-harden the surface of the bars which might have been softened during the step of removing them from the mold. The feeding of the holders with the bars advances the preceding holders through the refrigerator chamber. When a holder emerges through the outlet of the rehardening chamber it automatically actuates a dipping hopper which is filled with suitable coating, such as chocolate. This hopper is automatically raised so that the liquid therein covers the 24 ice cream bars in one operation. The hopper is automatically returned to its out-of-way position. The hopper is in an elongated tank in which the molten coating or chocolate is held so that on each operation, the hopper refills itself. Each holder is then automatically moved away from said hopper and passed above the larger coating tank so that all the surplus coating is allowed to drip back into the tank. In the event no coating is to be applied to the ice cream bars, the tank is kept empty and the movement of the hopper does not apply any coating to the bars, but the holder is automatically advanced along the conveyor guide. Then the ice cream bars are carried through another cooling or refrigerating chamber in which the coating on the ice cream bars in hardened. In the event that no coating is used, then this second re-cooling chamber maintains the hardness of the surface of the bars at a suitable point of their passage through the apparatus. The holders with the bars thereon are carried on suitable guides and by a suitable mechanism to a releasing mechanism over and above a carrier cage which has 24 troughs each tapering downwardly substantially in the shape of, but larger than the respective ice cream bars. The troughs are arranged in symmetrical pattern with respect to the pattern of arrangement of the ice cream bars on the holder. The lower ends of the bars in said troughs ride on a surface on which the dispensing carrier moves. At the releasing point a clamping mechanism of the holder is loosened so as to release the sticks and allow the dropping of the ice cream bars into the troughs of the discharge carrier therebelow. The bars are then carried in the discharge carrier over the surface and are suitably rocked or vibrated to prevent their freezing to the sides of the carrier troughs or to said supporting surface, and then are progressively dropped into chutes which chutes guide the respective bars in properly spaced relation into automatically fed bags held open in a suitable position by compressed air. The ice cream bars drop into said bags and are discharged by gravity into a conveyor which carries them to the usual place for the dispensing of the final product. The entire operations of bringing the bar on the holder and dropping it to the discharge carrier and then into the bags, and onto the conveyor under the bags, are all stopped simultaneously while the discharge carrier is returned to its operative position under the releasing mechanism.

In detail the apparatus includes a brine tank 1 of the usual type, a thawing tank 2, a rehardening refrigerator 3, automatic coating mechanism 4, an intermediate cooling or refrigerating tunnel 6, a tripping or releasing mechanism 7, a discharge mechanism 8, and a bagging mechanism 9, discharging onto a conveyor 11.

The brine tank 1 is of the usual refrigerator tank construction containing the customary brine, having suitable guides and being of suitable depth so as to surround molds 12 as they are passed through said brine from one end of the tank to the other. Each mold 12 is of any suitable type having a plurality of mold compartments 13 each compartment being open at the top and closed at the bottom and formed in the shape of the ice cream bar to be made. In the present illustration the shape is somewhat tapered from the open top toward the bottom of the mold compartment 13. The mold compartments are extended from a pan 14, the bottom 16 of which has in it holes 17 which form the open tops of the mold compartments 13. The mold compartments 13 extend individually downwardly from the pan bottom 16 so that they are individually contacted on all sides by the brine in the brine tank 1. For properly spaced support of the pans 14, each pan 14 has on it vertical bar legs 18 connected together by suitable braces 19, one of which braces is at the bottom of the leg bars 18 providing the riding edges on which the pans rest. The sides 21 of the pan 14 extend considerably above the bottom 16 and provide a rectangular space into which fits a stick holder 22.

Each stick holder 22 is of any of the usual types. In the type described in the present illustrative embodiment, the stick holder 22 has a bottom plate 23 which has, in this instance, twenty four holes 24, arranged in a pattern of equally spaced four rows with six holes in each row. Each hole 24 is larger than the usual cross sectional dimensions of the stick 26 to be molded into the ice cream bars. At each hole 24 there is struck out and turned upwardly a holder prong 27 formed in substantially V-shaped cross section and having a cutaway or reduced neck 28 at the base thereof. On the base plate 23 is slidably disposed a clamping or gripping plate 29 in which are provided a plurality of gripping or clamping holes shaped substantially as shown in Fig. 6. Each gripping hole 31 has a V-shaped end 32 opposite to the V-shaped gripping prong 27 so that the sticks 26 can be gripped by the edges thereof between the opposite corners of the respective V-shaped holder prongs 27 and V-shaped ends 32 of the gripping holes 31. Each hole 31 is widened out into a substantially circular hole 33 at its outer end and is narrowed at 34 between the two ends of the hole 31 so that the narrowed portion 34 of the hole 31 slides under the respective gripping prongs 27 adjacent to the neck 28 of said prongs 27. After the sticks 26 are placed in the respective holes 24 and 31 and between said opposite V-shaped gripping prongs 27 and the gripping edge 32, the clamping plate 29 is shifted so that the gripping ends 32 of the holes 31 are pressed against the edges of the sticks 26 and firmly grip said sticks 26 between the respective prongs 27 and said gripping ends 32 of said holes 31. In this position the sticks 26 are clamped or gripped with sufficient tightness to support thereon the weights of the individual ice cream bars.

The shifting of the gripping plate 29 is accomplished by a suitable mechanism. In this illustration a longitudinal side flange 36 extends upwardly from each side of the plate 23 and terminates at each end thereof in vertical brackets 37. Between the opposite brackets at each end is a shaft 38. A stub shaft 39 extends outwardly from each bracket 37 in registry with the intermediate shafts 38, which stud shaft 39 ride on the various guides and conveyors and hold the stick holder 22 suspended in position. To each side flange 36 near one end of the stick holder 22 is pivoted a bell crank 41, one arm of which extends at an incline upwardly to a point near but spaced from the adjacent transverse shaft 38. The other arm of the bell crank 41 extends horizontally along the side flange 36 and is pivoted at 42 to a link 43, which link 43 in turn is pivoted on a bracket 46 on the gripping plate 29. The upper arms of the bell crank 41 are connected at their upper ends by a transverse shaft 44 parallel with and spaced from the adjacent transverse shaft 38 of the side brackets 37. When the upward ends of the bell crank 41 are forced downwardly toward the plate 23, that will raise the pivot 42 in a toggle-like action and pull the gripping plate 29 so as to shift the gripping holes 31 away from the prongs 27 and release the sticks 26. When the bell crank 41 is turned so that its upper arm is turned upwardly the pivot is forced down and the link 43 pushes the gripping plate 29 in the opposite direction for gripping the sticks 26. The outline of each stick holder 22 is such that it snugly fits into the pan 14 and is held by the vertical sides of said pan 14 to properly locate the sticks 26 in the respective freezing compartments 13 of the molds 12.

At the thawing tank 2 the assembled units of molds and stick holders are lifted out of the brine and the ice cream bars are loosened for removal from the mold 12. The thawing tank 2 is of the usual type of tank containing a heating substance, preferably hot water. The molds are dipped into this tank 2 one by one momentarily so as to prevent the melting of the ice cream bars, yet loosen them from the mold. Then the stick holders 22 are lifted out of the pan 14 of the mold 23 and the loosened ice cream bars are lifted out therewith and held suspended on the respective sticks 26.

The stick holders 22 are then placed upon rails or conveyor guides 47 so that the bottom edges of the shorter sides on the outside of the holder 22 rest upon said rails 47. The rails 47 lead through the rehardening tunnel 3. In the refrigerating tunnel 3 the slightly softened surface of the ice cream bars is rehardened. The stick holders 22 are pushed along the rails 47 to the outlet opening 48 of the rehardening tunnel 3.

The coating mechanism 4 is adjacent to the outlet opening 48 of this rehardening tunnel 3. In the present illustration the path of the stick holders 22 is changed to right angles from the rail 47. It is to be understood that in some instances, the path of the conveying or travelling of the stick holders may be in a continuous straight line. A crossrail 49 extends from one corner of the outlet opening 48 of the refrigerating tunnel in such position that the bottom corners of the stick holder 22 ride thereon when pushed out from the outlet opening 48. From the other corner of the outlet opening 48 extends a frame 51 with a pair of pivoted supporting rails 52 to support the other corner of the bottom of the stick holder 22. It is to be noted that the pivoted supporting rails 52 are swingable out in the direction of the right angle advance of the stick holders 22 for further treatment in the method and device. The rails 52 are pivoted around vertical axes so that when the stick holders 22 are moved at right angles away from the outlet opening 48, these pivoted supporting rails 52 are swung around to point in the direction of said right angular movement and to provide a temporary rail in that direction. Suitable springs 54 at the pivots of the rails 52 urge the rails 52 back to the initial transverse position. A bar bracket 53 is provided outside of the outlet opening 48. This bar bracket 53 is the same length as the distance between the stick holder brackets 37 and the respective ends of this bar bracket 53 are inclined or mitered so as to correspond to the incline of the inner edges of the respective stick holder brackets 27, and to allow the moving of the holder 22 out of said opening 48. The top edge of this bar bracket 53 is aligned with the studshaft 39 on the side of the holder 22 facing the refrigerator outlet opening 48 when the holder 22 is above the coating mechanism. When the holder 22 is moved away from the coating mechanism, the rear inner stud shaft 39 rides on the top of the bar bracket 53, and the tilting of the holder 22 is thus prevented during this shifting.

When the stick holder 22 reaches its position above the coating mechanism 4 it automatically actuates said coating mechanism 4. The coating mechanism 4 includes a large elongated tank 56 which is located outside of and below the outlet opening 48, and directly beneath the position of the stick holders 22 when they are pushed out of the refrigerating tunnel 3. This tank then extends longitudinally at right angles to the axis of the refrigerator tunnel 3 so that the tank 56 is beneath the path of the stick holder 22 for a considerable distance while the stick holder 22 is moved away after the coating operation. Inside of the tank 56 and directly below the aforesaid resting position of the stick holders 22 is a dip hopper 57 reciprocably guided on vertical guides 58 at its opposite ends. Each of the vertical guides 58 has a hollow guide. A lug 59 is extended from the respective ends of the hopper 57 and engages these hollow guides 58 and holds the hopper 57 in upright position while the hopper 57 is reciprocated toward and away from the stick holder 22 at the outside of the outlet opening 48. The hopper 57 is usually entirely immersed below the level of the coating material, such as chocolate, in the tank 56 so that it is automatically refilled after each coating operation. The hopper 57 is reciprocated by means of an eccentric crank arm 55 which is pivoted to the top edge of a side of the hopper 57. The other end of the crank arm 55 is eccentrically pivoted to a drive gear 61. By rotating the drive gear 61 the crank arm 55 is raised and lowered so as to reciprocate the hopper 57 up and over the ice cream bars held on the stick holder 22 and then back into the tank 56. The drive gear 61 is connected to another smaller gear 62 which latter is connected through a slip clutch 63 to a transverse shaft 64 which drives a sprocket 66 of a chain 67. It is to be noted that the shaft 64 is substantially above the end of the stick holder 22 nearer to the direction of movement from the aforesaid position; namely, substantially above the pivoted supporting rails 52. The chain 67 extends opposite and the full length of the top of the outlet opening 48 of the rehardening tunnel 3 and is played around another sprocket 68. This chain 67 has a finger 69 extended therefrom. It is to be noted that the gear ratio and adjustment between the drive gear 61 and the drive gear 62 is such that during the first half of the revolution of the drive gear 61, during which the hopper 57 is brought up and over the ice cream bars, the finger 69 is carried by the sprocket chain 67 over to the rear sprocket 68 and is about ready to engage the transverse shaft 38 at the far end of the stick holder 22. As the driving gear 61 continues its rotation it will lower the hopper away from the ice cream bars and also it will cause the finger 69 to engage the transverse shaft 38 of the stick holder 22, and as the chain 67 travels to continue its cycle, the finger 69 is carried toward the pivoted rails 52 and it will push and advance the stick holder 22 in that direction. This motion will cause the swinging of the pivoted rails 52 parallel with said movement of the stick holder 22 and will provide temporary support. The stud shafts 39 of the stick holder 22 then ride over and engage conveyor rails 71 whereby they will be guided for further movement for subsequent operation. During the movement of the stick holde 22 over said rails 71 to a considerable distance, the dripping from the ice cream coating will drip off and into the extension of the tank 56.

The aforesaid automatic actuation of this coating and advancing mechanism is accomplished by a suitable switch 72 located on a frame member 73 spaced from and opposite to the upper corner of the outlet opening 48, in such position that when the stick holder 22 is pushed out of the outlet opening 48 sufficiently to be in proper location for the dipping operation, at that point the frame member of the stick holder 22 engages and operates the switch 72 so as to close the circuit of an electric motor 74, which electric motor through suitable reduction gearing 76 rotates the drive gear 61 one complete revolution. The switch 72 is adapted to be automatically opened for breaking the circuit of the electric motor 74 at the end of each revolution of said drive gear 61. This provides for intermittent operation controlled by the position of the stick holder 22 above the dipping tank. The switch 72 in the present illustration, is a mercury circuit breaker. In this form a mercury switch of the usual type in a tube 77 is suitably mounted on an oscillating disk 78. From the disk 78 extends a yoke 79 around the frame member 73 and terminates in a free abutment end 81 in the path of one of the frame portions of the stick holder 22 when it is pushed out of the rehardening tunnel 3. The abutment end 81 is above the center of rotation of the disk 78 so that it is pushed down so as to move the pivoted disk 78 in a clockwise direction, viewing Fig. 13 when engaged by the stick holder 22. In this position the mercury in the tube 77 is in contact with both terminals of the electric circuit controlling the electric motor 74 and closes the same. An ear 82 extends from the oscillating disk 78. This ear 82 is connected by suitable line or cord or wire 83 to the side or top of the hopper 57 and is of such length that whenever the hopper 57 reaches the end of its down stroke, the pull thus exerted on the line 83 will exert a pull on the ear 82 so as to turn the oscillating disk 78 in a contra-clockwise direction, viewing Fig. 13, and thereby shift the position of the mercury in the tube 77 and uncover one or both of the contacts of the electric circuit and break the circuit of said electric motor 74. After the motor 74 stops, the momentum rotates the gear 61 about another quarter of a revolution, raising the hopper 57 about halfway up its upward stroke, filled and ready for the next cycle of operation. During each revolution, not only the dipping of the ice cream bars is performed, but the coated ice cream bars are advanced in the stick holder 22 toward the conveyor bars or rails 71 and toward the next step of operation.

The rails 71 lead into and through the other cooling tunnel 6. This cooling tunnel 6 has the function of hardening the coating upon the surface of the ice cream bars while they are passed through the apparatus. It is to be noted that if no coating is required on the ice cream bars, then the cycle of operation repeated at the hopper 57 is merely for the purpose of advancing and moving the stick holder 22 and the ice cream bars over to the conveyor rails 71 according to the speed of feed by the operator. In such instance there is no chocolate or coating material in the tank 56 and therefore the hopper 57 moves empty. Even under such circumstances, the cooling tunnel 6 has the important function of maintaining a solid unmelted surface on the ice cream bars throughout the various steps of method and operation in their treatment and manufacture, and shortly before their release and bagging.

At this point of the method and the operation the ice cream bars are edible and ready for packaging or bagging.

Conveyor rails 84 extend from the cooling tunnel 6 at an upward incline toward the tripping mechanism 7. At the tripping mechanism 7 the conveying rails 86 are substantially horizontal. The stick holders 22 are pushed up on the inclined rails 84. Above the inclined rails 84 and parallel with its incline is provided an endless chain 87 played around suitable sprockets 88 at its opposite ends, which sprockets 88 are supported on suitable vertical frame members 89 and transverse shafts 91. On the endless chain 87 are provided two pairs of carrier lugs 92. Each pair of lugs 92 is so spaced that they engage the cross shafts 38 of the stick holder 22 at both ends of the stick holder 22. As the endless chain 87 is shifted around by the rotation of the sprockets 88, the carrier lugs 92 carry the stick holder 22 up and push it onto the horizontal rails 86 at the tripping mechanism 7. The lugs 92 are so spaced on the chain 87 that when one stick holder 22 is pushed almost completely off the inclined rails 84 and onto the tripping mechanism 7, the other set of lugs 92 engages the transverse shafts 38 of another stick holder 22. The engagement is first performed by the leading lug 92 of each pair so that the leading lug 92 of each pair first engages the cross shaft 38 between the leading or front brackets 37 of the stick holder 22 and pulls it upwardly on the inclined rails 84. The trailer lug 92 of each pair is so spaced from the first lug 92 that it engages the transverse shaft 38 at the trailing end of the stick holder 22 when the latter passes under the lower sprocket 88.

The particular holder 22 is at momentary rest on the horizontal rails 86 in the tripping mechanism 7. Under the rails 86 is provided an ice cream bar carrier 93. This carrier 93 is divided into twenty-four compartments 94 corresponding in number pattern and spacing to the pattern of ice cream bars hanging from the stick holder 22. It is to be noted that the compartments 94 in the carrier 93 are larger in circumferential dimensions than the respective ice cream bars so as to accommodate the ice cream bars with a limited looseness or play. The carrier 93 is located above a platform 96 spaced below the horizontal rails 86 on which latter is suspended the stick holder 22. In this aligned position the actual tripping of the stick holders 22 is accomplished so as to drop the ice cream bars into the respective compartments 94 of the carrier 93. In the present illustration in connection with the structure of the stick holder 22 as heretofore described, the tripping is accomplished by pushing the transverse shaft 44 away from the shaft 38 above it, as a result of which the gripping plate 29 is shifted so as to release the sticks 26 from said holder 22. This is accomplished by a wedge cam 97 which is fixed on a shaft 98 journalled on the vertical frame members 89 above the position of the transverse shaft 44 of the stick holder 22 when the latter is aligned above the carrier 93. Suitable means are provided to turn the shaft 98 and the wedge cam 97. In the present illustration a handle 99 is provided for turning the shaft 98 and the wedge cam 97 in clockwise direction viewing Fig. 14. The handle 99 is weighted at its free end and is over center when the cam 97 is in inoperative position so as to keep said cam 97 in said out-of-way position. When turned the wedge end 101 of the cam wedge 97 is forced between the transverse shaft 44 and the shaft 38 above it. As the handle 99 is turned further it forces the transverse shaft 44 away and pushes it downwardly thereby releasing the sticks 26 in the manner heretofore described. The released ice cream bars then drop into the compartments 94 of the carrier 93 and are carried on said carrier over to the bagging mechanism 9. It is to be noted that the operation of the conveying device over the inclined rails 84 and of the releasing and bagging devices and of the movement of the carrier 93 and the removal of the stick holder 22 are coordinated and operated by the same motor simultaneously.

The platform 96 under the carrier 93 extends to a considerable distance and forms the top of the bagging mechanism 9. On this platform 96 is a guide plate 102. Opposite rails 103 are provided on the longitudinal edges of the platform 96, and the carrier 93 has suitable wheels 100 thereon which ride on the rails 103 while the carrier 93 is moved from one end of the platform 96 to the other. The movement of the carrier 93 from the tripping mechanism 7 to the discharge mechanism 8 is accomplished by a chain 104 on the frame of the machine which chain 104 moves over suitable sprockets 106 and has a dog 107 thereon which latter engages an edge of the carrier 93 so as to pull the carrier away from below the tripping mechanism 7 and pull it over the entire length of the platform 96. The guide plate 102 prevents the ice cream bar from falling through the compartments 94 of the carrier 93. The guide plate 102 allows the easy sliding of the ice cream bars in the carrier 93.

As heretofore described, the twenty-four compartments in the carrier 93 are divided in four rows of six compartments each. At the area of discharge from the platform 96 are provided four orifices 108 which are arranged in a staggered series so that each orifice 108 is in alignment with one row of said carrier compartments 94 but the orifices 108 are off-set longitudinally of the platform preferably each to the full length of an orifice 108, so that the bars are discharged from each row of carrier compartments 94 at a different spaced point. Just in advance of each orifice 108 is formed a rocking plate 109 at a slight incline upwardly to the edge of the respective orifice 108 and with a sudden drop into the orifice 108. The object of these rocking plates 109 is to lift the bottoms of the ice cream bars when they are slid over it toward the orifices 108. First the leading corner of the bottom of each ice cream bar begins to ride up on one of these inclined rocking plates 109 which rocks the ice cream bar with the top opposite to the direction of movement, then as the leading corner of the bottom of the ice cream bar rides over the end of the rocking plate 109 it drops and the ice cream bar rocks in the opposite direction, and by this rocking motion the ice cream bar is effectively loosened from the carrier compartment 94 and from the surface of the guide plate 102 just about when the ice cream bar reaches the respective orifice 108, so that it can drop out of the carrier compartment 94 and into the orifice 108. This prevents the sticking of the ice cream bars in the carrier compartments 94. A plurality of such loosening plates 109 or corrugations may be provided transversely as needed for the particular type of frozen confection to prevent the confection from sticking to the carrier compartments and to the guide plate thereunder.

After the carrier 93 reaches the farthest end 111 of the platform 96, the dog 107 of the chain 104 is withdrawn from the carrier by reason of its movement around its sprocket and the carrier is permitted to return to the tripping mechanism to receive another load of ice cream bars. The return of the carrier 93 in the present illustration is accomplished by a counterweight 112 which hangs on a line 113 which latter rides over a pulley 114 at the intake end of the platform 96, and is secured to the end of the carrier 93. When the carrier is released from the dog 107, then, by the action of the counterweight 112 and line 113, it is pulled back to its initial position to receive a load of ice cream bars from another stick holder 22. An abutment 116 at the end of the platform 96 under the tripping mechanism stops the movement of the carrier 93 uniformly in aligned position with the position of the stick holder 22 thereabove.

The movement of the conveyor chains 98 and 104 are controlled by the same switch. A switch bar 117 is extended in front of the platform 96 to the frame member adjacent the tripping mechanism where it is provided with a guide bracket 118 and a handle 119. The other end of the bar 117 is at the farthest end 111 of the platform 96 and is curved around to operate a switch 121. After the operator of the machine turns the tripping handle 99 so as to drop the ice cream bars from the stick holder 22 into the compartments 94 of the carrier 93, then the operator pulls the handle 119 of the switchbar 117 and thereby turns on the switch 121 to the position closing the electric circuit of a motor 122. This motor, through suitable transmission gearing 123, rotates the sprockets 106 of the chain 104 so as to pull the carrier over the length of the platform 96 as heretofore described. A transmission shaft 124 is extended from said transmission gearing 123 to above said carrier conveyor chain 104 and above a top railing 126 where it drives the sprockets 127 of another chain 128 which is provided with suitable dogs 129. The top railing 126 is in continuation of the top railing 86 in the tripping mechanism 7 where the stick holders 22 stop for releasing the ice cream bars. The respective dogs 129 on this top chain 128 engage the stick holders 22 and carry them away from the tripping mechanism 7 over the top railing 126. This top railing 126 terminates in a downwardly inclined rail portion and in an upwardly curved end above a work table 121 where the empty stick holders are removed from the railing and refitted with sticks for further use as heretofore described.

A chain and sprocket transmission 132 above the tripping mechanism 7 transmits rotation from the sprocket of the top chain 128 to the conveyor chain 87 above the inclined railing 84. Therefore, when the operator pulls the switchbar 117 and turns on the switch 121, then the motor 122 is started and it sets in motion the chain 104 for carrying the carrier 93 over the platform and over the discharge mechanism; it also rotates simultaneously the top chain 128 so as to remove the emptied stick holder 22 from the tripping mechanism 7 and discharge it from the mechanism; it also, through the chain and sprocket transmission 132, rotates the conveyor chain 87 for pulling up another stick holder 22 to the tripping mechanism 7 in position for dumping the ice cream bars into the compartments 94 of the carrier 93. The carrier 93 has on its front part an abutment 133 for engaging the button of the switch 121. When the carrier 93 reaches the end of its stroke and at just about the time when the dog 107 is disengaged from the carrier, the abutment 133 on said carrier 93 abuts against the switch 121 and shuts it off. Thus the entire operation comes to a standstill at the time when the next stick holder 22 is in position in the tripping mechanism 7. The carrier 93 is pulled back by its counterweight 112 into alignment with the stick holder 22. During this intermission in the operation a brief period of time is allowed to the operator to actuate the tripping mechanism and empty the stick holder 22 and thereby fill the carrier 93. Then the operator turns on the switch 121 and the previous cycle of operation is repeated.

Under the platform 96 and under each orifice 108 there is a bagging mechanism 9. Each bagging mechanism 9 includes a downwardly tapered chute 134. On the lower end of each chute 134 is a frame 136 which consists of a pair of parallel side plates 137 between which a stack of paper bags 138 are arranged so that the paper bags 138 are fed in an upright position toward and below the rear edge of the bottom of the chute 134. The stack of paper bags 138 is fed forward by the pressure exerted thereon by a weight 139 supported on an arm 141 which latter is pivoted on a fulcrum 142 on the back of each chute 134. Each bag is preferably so made that one side of it is shorter than the other and the bags are fed toward the chutes 134 in such a manner that the shorter side of the bags face in the direction of the chute 134. The lower portions of the side plates 137 below the chute 134 are cut back so as to form a loading space below each chute 134. At this point the top flap of each bag is held by a short flange 143 and the bottoms of the bags are held by another short flange 144 which flanges extend transversely across the opening between the front ends of the plate 137 aligned with the rear wall of the chute 134. On the front wall of each chute 134 is an opening 146 which is directed downwardly so as to form an intake for compressed air. This intake opening 146 is connected by a conduit 147 to a manifold 148 into which manifold a motor driven blower 149 blows compressed air. The air flow is regulated by a suitable butterfly valve 151 across each conduit 147. The air blown through these intake openings 146 blows downwardly and out through the bottom of each chute 134 and into the loading space in front of the plates 137 and into the first bag 138 of the stack between said plates 137. The blower pressure is just strong enough to keep the bag open without pulling it out from behind the retaining flanges 143 and 144. In order to prevent the pulling away of the bag 138, a front shield 152 covers the top portion and front of the loading space so that the open side of the bag 138 bears against it and thus the opening of the paper bag is limited. The chutes 134 are so dimensioned as to hold the ice cream bars upright. The ice cream bars drop down from the orifices 108 through the chutes 134 into the open paper bag 138. The weight of the ice cream bars in the paper bag 138 pulls the bag out from the flanges 143 and 144. The shield 152 and a wire guide 153 surrounding the middle portion of this loading space or compartment prevents the toppling over of the ice cream in the bag 138. Thus the ice cream in the bag 138 slides endwise downwardly. An inclined apron 154 extends from the bottom of the loading space and away from the bottom flange 144 so that when the bottom of the bag is pulled away from the flange 144 by the weight of the ice cream bar, it slides down on the apron 154 and slides onto a moving belt conveyor 156 whereby it is carried to an operator for placing into suitable containers and boxes or in storage as desired. The belt conveyor 156 is driven by the same motor 122 which drives the various chain conveyors and chains of the tripping mechanism, discharging mechanisms and carrier moving mechanism. therefore when the carrier 93 turns off the switch 121, as heretofore described, the conveyor belt 56 also stops and all these moving elements start again after each tripping operation when the operator turns on the switch 121.

By the method and apparatus heretofore described frozen confections, such as ice cream bars can be made in continuous, automatic operations. The ice cream bars are advanced on the holders on a predetermined path, and through refrigerating spaces surrounding spaced portions of said path so that the softening of the ice cream bars during the treatment is positively prevented. On a portion of the path between such spaced refrigerating spaces the ice cream bars are automatically coated. Thus the ice cream bars are rehardened both before and after the coating. The advancing of the ice cream bars toward the releasing or tripping mechanism, and then to and through the bagging mechanisms is co-ordinated so that it is performed at the speed of the operator. The number of operators is reduced in comparison with prior methods, and manual handling of the ice cream bars is minimized. This method and apparatus produces ice cream bars in large quantities, speedily and without waste of labor or material, and it results in a uniform and superior product.

I claim:

1. In an apparatus for making frozen confections, a holder to carry a plurality of frozen confections suspended in a predetermined pattern, conveyor guides, means for moving said holder on said guides, a platform under a portion of said conveyor guides, a carrier disposed between said platform and said conveyor guides, said carrier having compartments arranged in said predetermined pattern, each compartment being bottomless and being larger than the respective frozen confections, means on said holder for releasing said frozen confections from said holder, means for aligning said carrier with said holder, and means for actuating said releasing means on the holder.

2. In an apparatus for making frozen confections, a holder to carry a plurality of frozen confections suspended in a predetermined pattern, conveyor guides, means for moving said holder on said guides, a platform under a portion of said conveyor guides, a carrier disposed between said platform and said conveyor guides, said carrier having compartments arranged in said predetermined pattern, each compartment being bottomless and being larger than the respective frozen confections, means on said holder for releasing said frozen confections from said holder, means for actuating said releasing means, means to advance said carrier from over said platform from a first position in alignment with said holder into a second position, said platform in advance of said second position, having a plurality of spaced discharge holes aligned with the paths of the confections carried over said platform by said carrier, and means under said holes to receive said frozen confections dropping through said holes.

3. In an apparatus for making frozen confections, a holder to carry a plurality of frozen confections suspended in a predetermined pattern, conveyor guides, means for moving said holder on said guides, a platform under a portion of said conveyor guides, a carrier disposed between said platform and said conveyor guides, said carrier having compartments arranged in said predetermined pattern, each compartment being bottomless and being larger than the respective frozen confections, means on said holder for releasing said frozen confections from said holder, means for actuating said releasing means, means to advance said carrier over said platform from a first position in alignment with said holder into a second position, said platform in advance of said second position having a plurality of spaced discharge holes aligned with the paths of the confections carried over said platform by said carrier, means under said holes to receive said frozen confections dropping through said holes and means adjacent each of said discharge holes for loosening the respective confections in the respective compartments.

4. In an apparatus for making frozen confections, a carrier having a plurality of compartments open at the top and bottom, means for disposing individual frozen confections within the respective compartments, a platform under said carrier in position to engage and support the bottoms of said confections, means for advancing said carrier in a path, said compartments being arranged in a plurality of rows parallel with said path, said surface platform having a series of staggered discharge holes therethrough respectively in alignment with said rows, and means to rock the frozen confections in the respective compartments near the respective discharge holes.

5. In an apparatus for making frozen confections, a carrier having a plurality of compartments open at the top and bottom, means for disposing individual frozen confections within the respective compartments, a platform under said carrier in position to engage and support the bottoms of said confections, means for advancing said carrier in a path, said compartments being arranged in a plurality of rows parallel with said path, said platform having a series of staggered discharge holes therethrough respectively in alignment with said rows, and inclined protuberances projecting from said platform in advance of each discharge hole, said protuberances rising toward said discharge holes so as to engage the leading corner of the bottom of the respective frozen confections and tilt said confections in the respective compartments.

6. In an apparatus for making frozen confections, a holder to hold a plurality of said frozen confections in predetermined spaced pattern, releasable means in said holder to suspend said frozen confections thereon, guiding elements on which said holder is advanced over a predetermined path, a tripping mechanism on said path for releasing said releasable means on the holder to free said frozen confections from said holder, a carrier beneath said tripping mechanism aligned with the position of the holder at said tripping mechanism and adapted to receive said frozen confections in the same pattern as the pattern of their arrangement on said holder, a supporting surface under said carrier being extended beyond said carrier, chutes extended from said supporting surface, the intakes of said chutes being at said supporting surface and being aligned with the respective positions of said frozen confections in said carrier, means intermittently to move said holder on said predetermined path to said tripping mechanism, means to move the carrier on said supporting surface from below said tripping mechanism to and over the intakes of said chutes, said carrier being adapted to discharge said frozen confections into said chutes, means to return said carrier to its aligned position under said tripping mechanism, means to simultaneously drive said holder advancing means and said carrier moving means, means to move said holders away from said tripping mechanism, driving means for simultaneously driving all the said advancing and moving mechanisms, means for actuating said driving mechanism after the frozen confections are dropped from said holder into said carrier, and means actuated by said carrier after said carrier passes over and beyond said chutes to stop said driving mechanism.

7. In an apparatus for making frozen confections, a plurality of holders, releasable means on each holder to hold a plurality of frozen confections in a predetermined spaced relation on said holders, a continuous system of guides to guide the advance of said holders on a predetermined path, a releasing mechanism on said path, the portion of the guides approaching said releasing mechanism being inclined upwardly, conveyor means above said inclined portion of said guides to advance one of said holders to said releasing mechanism, a carrier open at the top and bottom and disposed beneath said releasing mechanism in alignment with the releasing position of said holder and being adapted to receive the frozen confections released from said holder by said releasing mechanism, a conveyor mechanism to move said carrier away from said aligned position, a supporting surface, said carrier being moved over said surface, a plurality of chutes leading from said surface being spaced from said aligned position of the carrier but being in the path of the carrier movement and being aligned with the positions of the frozen confections in said carrier for receiving said frozen confections when said carrier is passed over the respective chutes, said carrier being adapted through its open bottom to discharge said frozen confections into the respective chutes.

8. In an apparatus for making frozen confections, a plurality of holders, releasable means on each holder to hold a plurality of frozen confections in a predetermined spaced relation on said holders, a continuous system of guides to guide the advance of said holders on a predetermined path, a releasing mechanism on said path, the portion of the guides approaching said releasing mechanism being inclined upwardly, conveyor means above said inclined portion of said guides to advance one of said holders to said releasing mechanism, a carrier open at the top and bottom and disposed beneath said releasing mechanism in alignment with the releasing position of said holder and being adapted to receive the frozen confections released from said holder by said releasing mechanism, a conveyor mechanism to move said carrier away from said aligned position, a supporting surface, said carrier being moved over said surface, a plurality of chutes leading from said surface being spaced from said aligned position of the carrier but being in the path of the carrier movement and being aligned with the positions of the frozen confections in said carrier for receiving said frozen confections when said carrier is passed over the respective chutes, said carrier being adapted to discharge said frozen confections through its open bottom into the respective chutes, means to simultaneously interrupt the operation of said conveying means and said conveying mechanism, and means to automatically return said carrier to its aligned position after said frozen confections are discharged from the carrier.

9. In an apparatus for making frozen confections, a holder, releasable means on the holder to hold a plurality of frozen confections in a plurality of spaced rows, a releasing mechanism to release said holding means for dropping said frozen confections from said holder, a supporting surface extended beneath said releasing mechanism, a carrier open at the top and bottom and disposed on said supporting means in alignment with said holder in said releasing mechanism, said carrier having a plurality of compartments arranged in parallel rows symmetrically to the arrangement of the frozen confections on said holder so as to receive the released frozen confections in individual compartments, the inner circumference of said compartments being larger than the outer circumference of said frozen confections to permit said frozen confections to pass through the bottom of the respective compartments and rest on said supporting surface, said carrier being movable away from said aligned position and over said surface, and spaced discharge chutes extending from said surface in the path of the respective rows of compartments of said carrier to receive the respective frozen confections through the bottom of said carrier during the moving of the carrier over said surface.

10. In an apparatus for making frozen confections, a holder, releasable means on the holder to hold a plurality of frozen confections in a plurality of spaced rows, a releasing mechanism to release said holding means for dropping said frozen confections from said holder, a supporting surface extended beneath said releasing mechanism, a carrier on said supporting means aligned with said holder in said releasing mechanism, said carrier having a plurality of compartments open at the top and bottom and arranged in parallel rows symmetrically to the arrangement of the frozen confections on said holder so as to receive the released frozen confections in individual compartments, the inner circumference of said compartments being larger than the outer circumference of said frozen confections to permit said frozen confections to pass through the bottom of the respective compartments and rest on said supporting surface, said carrier being movable away from said aligned position and over said surface, spaced discharge chutes extending from said surface in the path of the respective rows of compartments of said carrier to receive the respective frozen confections during the moving of the carrier over said surface, means to automatically return the empty carrier on said surface to said releasing mechanism, and means to align said carrier with the position of said holder at said releasing mechanism.

11. In an apparatus for making frozen confections, a holder, releasable means on the holder to hold a plurality of frozen confections in a plurality of spaced rows, a releasing mechanism to release said holding means for dropping said frozen confections from said holder, a supporting surface extended beneath said releasing mechanism, a carrier on said supporting means aligned with said holder in said releasing mechanism, said carrier having a plurality of compartments open at the top and bottom and arranged in parallel rows symmetrically to the arrangement of the frozen confections on said holder so as to receive the released frozen confections in individual compartments, the inner circumference of said compartments being larger than the outer circumference of said frozen confections to permit said frozen confections to pass through the bottom of the respective compartments and rest on said supporting surface, said carrier being movable away from said aligned position and over said surface, spaced discharge chutes extending from said surface in the path of the respective rows of compartments of said carrier to receive the respective frozen confections during the moving of the carrier over said surface, each of said chutes being aligned with one of the rows of compartments of said carrier, and said chutes being spaced one from another in the direction of movement of said carrier over said surface.

12. In an apparatus for making frozen confec- 2,535,231

17 tions, a holder, releasable means on the holder to hold a plurality of frozen confections in a plurality of spaced rows, a releasing mechanism to release said holding means for dropping said frozen confections from said holder, a supporting surface extended beneath said releasing mechanism, a carrier on said supporting means aligned with said holder in said releasing mechanism, said carrier having a plurality of compartments open at the top and bottom and arranged in parallel rows symmetrically to the arrangement of the frozen confections on said holder so as to receive the released frozen confections in individual compartments, the inner circumference of said compartments being larger than the outer circumference of said frozen confections to permit said frozen confections to pass through the bottom of the respective compartments and rest on said supporting surface, said carrier being movable away from said aligned position and over said surface, spaced discharge chutes extending from said surface in the path of the respective rows of compartments of said carrier to receive the respective frozen confections during the moving of the carrier over said surface, each of said chutes being aligned with one of the rows of compartments of said carrier, said chutes being spaced one from another in the direction of movement of said carrier over said surface, for receiving frozen confections discharged from said chute.

13. In a method of making frozen confections, the steps of suspending the frozen confections in a group in a predetermined pattern, moving said suspended group of confections over a predetermined path, simultaneously treating said moving group of confections, simultaneously dropping the treated group of confections, supporting the dropped confections from the bottom while still arranged in the same pattern in said group, horizontally moving said bottom supported confections, rocking a part of said group of bottom supported confections while they are moving, and depriving said part of said group of confections of bottom support after it has been rocked.

14. In a method of making frozen confections, the steps of suspending the frozen confections in a group in a predetermined pattern, moving said suspended group of confections over a predetermined path, simultaneously treating said moving group of confections, simultaneously dropping the treated group of confections, supporting the dropped confections from the bottom while still arranged in the same pattern in said group, horizontally moving said bottom supported confections, and depriving successive parts of said group of said confections of bottom support.

15. An apparatus for making confections comprising means for suspending the confections in a group in a predetermined pattern, means for moving said suspended confections in a predetermined path for treatment, means effective at a point in said path for releasing said confections from said suspending means, means for supporting said released confections from the bottom, means for advancing said released confections over said supporting means in said predetermined pattern, and means for sequentially depriving said advancing confections of the support of said supporting means.

16. An apparatus for making confections comprising means for suspending the confections in a group in a predetermined pattern, means for moving said suspended confections in a predetermined path for treatment, means effective at a

18 point in said path for releasing said confections from said suspending means, means for supporting said released confections from the bottom, means for advancing said released confections over said supporting means in said predetermined pattern, means for rocking said advancing confections, and means for sequentially depriving said advancing and rocked confections of the support of said supporting means.

17. A method of making frozen confections comprising molding and freezing confections onto sticks, carrying said frozen confections suspended by said sticks in a group over a predetermined path, dropping said group of frozen confections at a point in said path, supporting said group of dropped confections while leaving said sticks free, moving said group of supported confections while leaving said sticks free, rocking part of said group of frozen confections while said group is moving, and depriving said part of said group of confections of support after said rocking.

18. A method of making frozen confections comprising molding and freezing confections onto sticks, carrying said frozen confections suspended by said sticks in a group of predetermined pattern over a predetermined path, dropping said group of frozen confections at a point on said path, supporting said group of dropped confections in said pattern while leaving said sticks free, moving said supported group of confections in said predetermined pattern, and depriving successive parts of said moving group of confections of support in sequence.

19. An apparatus for making confections comprising means for molding and freezing confections onto sticks, means for suspending said confections by said sticks in a group of predetermined pattern, means for advancing said suspending means, means for releasing said suspending means to release the sticks of said group of confections, a supporting plate having drop openings therein, said plate being arranged to support said released group of confections from below, and means for advancing said released group of confections over said supporting plate and over said drop openings in sequence.

20. In an apparatus for making frozen confections, a carrier having a plurality of compartments open at the top and bottom, means for disposing individual frozen confections within the respective compartments, a platform under said carrier in position to engage and support the bottoms of said confections, and means for advancing said carrier in a path, said compartments being arranged in a plurality of rows parallel with said path, and said platform having a series of staggered discharge holes therethrough respectively in alignment with said rows.

21. In an apparatus for making frozen confections, a holder to hold a plurality of said frozen confections in a predetermined spaced pattern, releasable means in said holder to suspend said frozen confections thereon, guiding elements, means for advancing said holder on said guiding elements over a predetermined path, mechanism at a point on said path for releasing said releasable means, a carrier open at the top and bottom and movable between two positions the first of which is beneath said holder at said point and the second of which is remote therefrom, said carrier being adapted to receive said frozen confections in said pattern, a platform under and extended beyond said carrier, chutes extended from said platform, the intakes of said chutes being aligned with the respective positions of said frozen confections in the second position of said carrier, means to move the carrier from said first to said second position, means to return said carrier to its first position from said second position, means simultaneously to drive said holder advancing means and said carrier moving means, and means actuated by said carrier at said second position for interrupting the operation of said holder advancing means and said carrier moving means.

MARLIN B. RASMUSSON.

REFERENCES CITED

The following references are of record in the file of this patent:

UNITED STATES PATENTS

| Number | Name | Date |
|---|---|---|
| 1,494,498 | Morgan | May 20, 1924 |
| 1,498,872 | Hammill | June 24, 1924 |
| 1,900,355 | Maurer | Mar. 7, 1933 |
| 1,951,786 | Birr | Mar. 20, 1934 |
| 1,960,456 | Robb | May 29, 1934 |
| 2,003,516 | Schnaier | June 4, 1935 |
| 2,048,364 | Willems | July 21, 1936 |
| 2,124,387 | Taylor | July 19, 1938 |
| 2,204,495 | Hogue | June 11, 1940 |